United States Patent [19]

Rowan et al.

[11] 4,266,510
[45] May 12, 1981

[54] PORTABLE SILO

[76] Inventors: Robert A. Rowan; Leroy Mathis, both of P.O. Box 68, Enigma, Ga. 31749

[21] Appl. No.: 111,360

[22] Filed: Jan. 11, 1980

[51] Int. Cl.³ .............................................. A01K 5/00
[52] U.S. Cl. ..................................... 119/51 R; 119/60
[58] Field of Search .................. 119/51 R, 58, 60, 16, 119/20; 414/132

[56] References Cited

U.S. PATENT DOCUMENTS

| | | | |
|---|---|---|---|
| 1,976,721 | 10/1934 | Gengler | 119/20 X |
| 3,030,920 | 4/1962 | Hibbert | 119/60 |
| 3,063,416 | 11/1962 | Elstner | 119/51 R |
| 3,452,715 | 7/1969 | Flittie | 119/51 R |
| 3,620,192 | 11/1971 | Taylor | 119/16 |
| 3,837,506 | 9/1974 | Dreier | 414/132 |
| 4,009,687 | 3/1977 | Korthals | 119/51 R |

*Primary Examiner*—Hugh R. Chamblee
*Attorney, Agent, or Firm*—Newton, Hopkins & Ormsby

[57] ABSTRACT

Juxtaposed pairs of upright portable bunker wall sections are erected on level ground in longitudinal alignment and tied together and braced by a system of adjustable and portable bracing units along the length of the elongated open ended and open top silage bunker thus formed. The bunker is filled with silage up to a proper level by a mobile loading machine with the formation of the silage bunk progressing rearwardly. As the silage bunk is thus formed, the forwardmost bunker wall sections are shifted to the rear end of the bunker to enable the formation of a uniform depth silage bunk of any desired length. As bunker wall sections are removed, the formed or molded silage bunk is covered and protected by a dark plastic film. A controlled feeding barrier is employed at one or both ends of the silage bunk including side parallel guide units on skids which straddle the opposite sides of the bunk and a transverse feeding gate which slides forwardly on the guide units in response to pressure exerted on the gate by animals feeding on one or both ends of the silage bunk.

8 Claims, 11 Drawing Figures

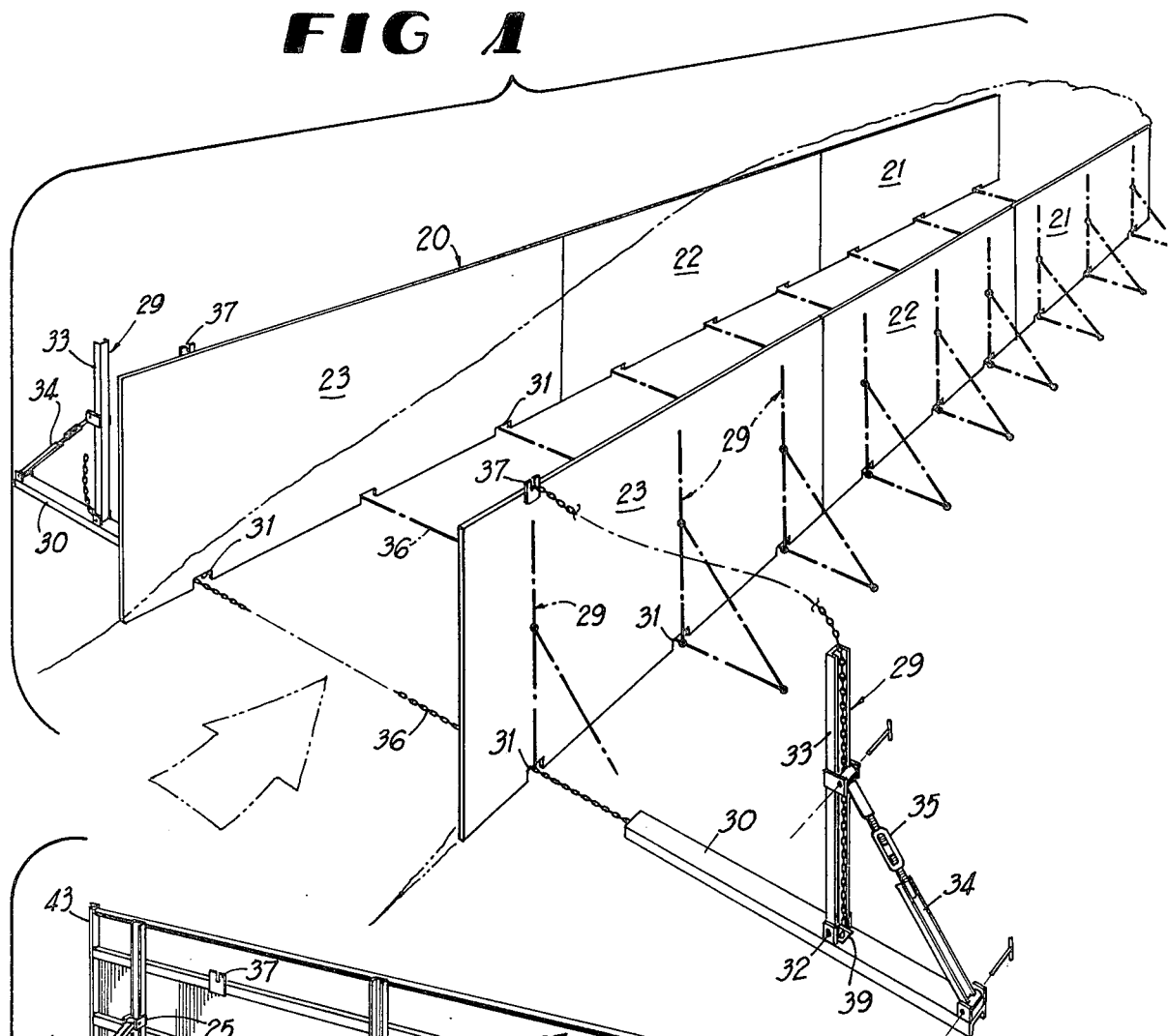
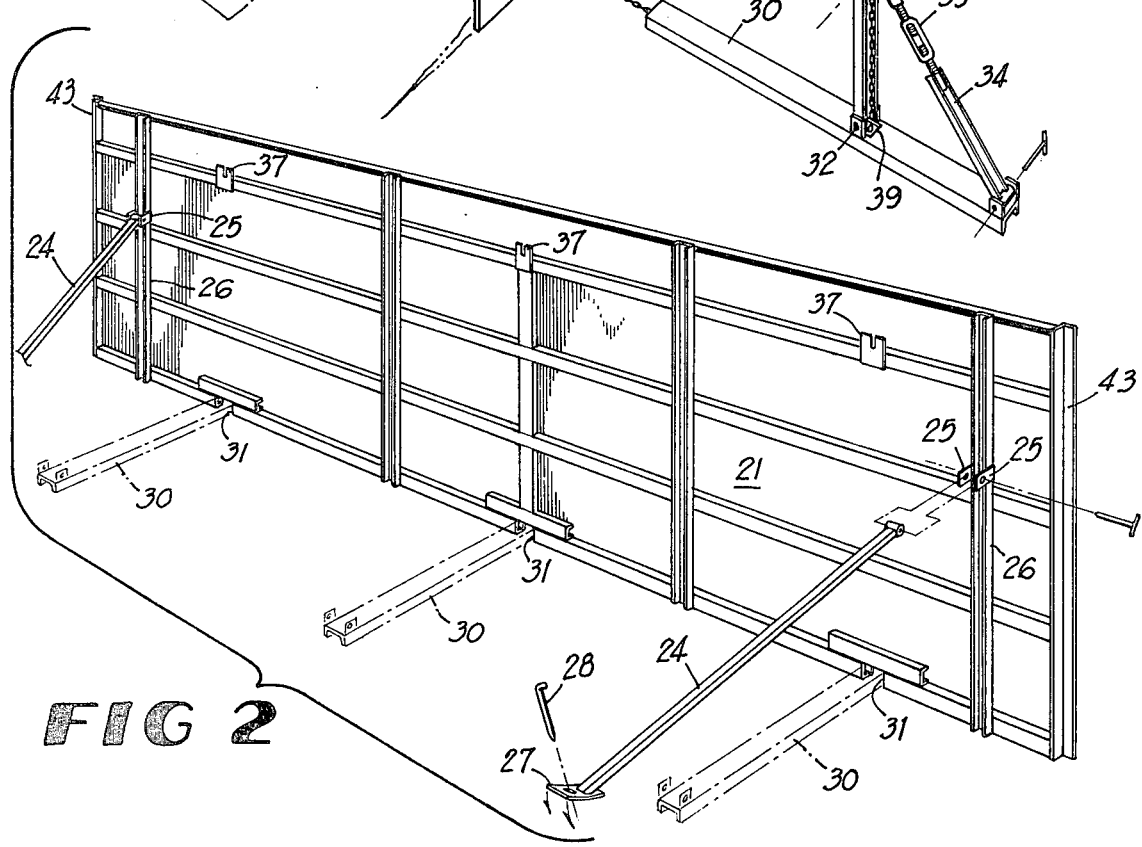

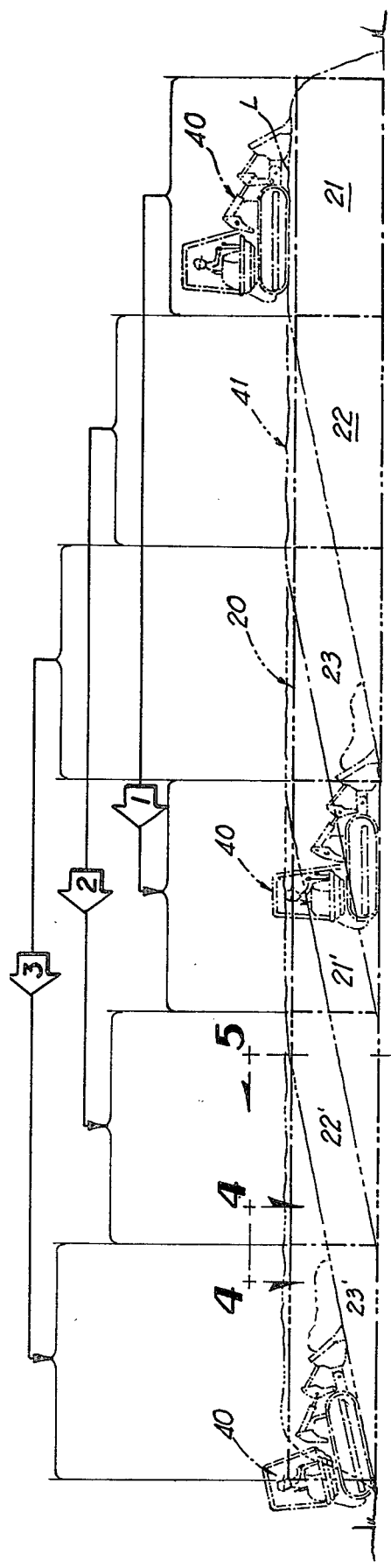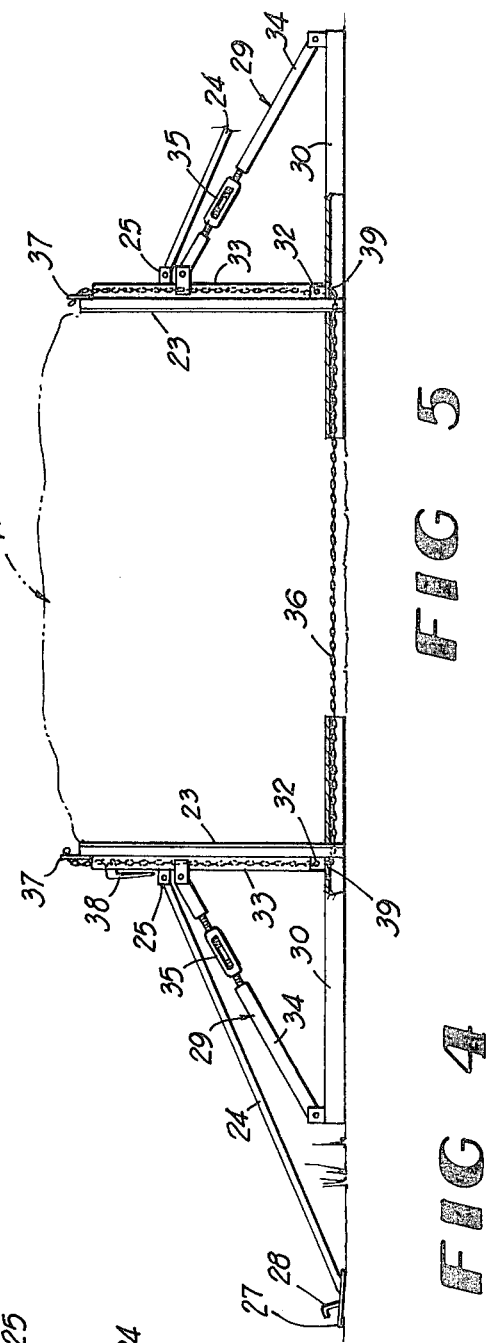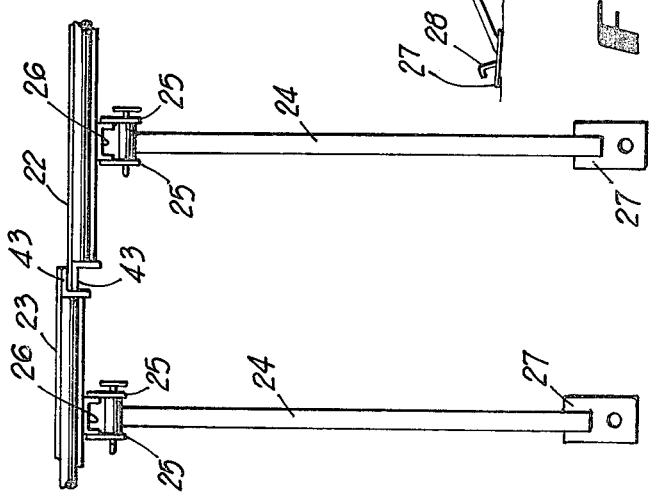

PORTABLE SILO

BACKGROUND OF THE INVENTION

The present invention seeks to satisfy a need for a more economical and more efficient apparatus to form a silage feed bunk and to control the consuming of the silage by feeding animals at one or both ends of the bunk formed by the apparatus.

A particular objective of the invention is to provide an apparatus of the above class which is simplified, comparatively lightweight, without sacrifice of sturdiness, and constructed in readily portable sections.

A further object is to provide a portable sectional silage bunker including juxtaposed side wall sections which can be moved and repositioned at the rear end of the bunker during the gradual formation of a silage bunk up to a prescribed level so that the bunk can be formed in any desired length economically.

Another objective of the invention is to provide an open top and open ended elongated horizontal bunker structure which is very compatible with the use of a front end loader to build up a silage feed bunk or mass to a uniform depth between the two portable side walls of the bunker which, in essence, comprises a forming means or mold for the silage bunk which is dismantled or separated from the bunk after its formation.

Another important feature and objective of the invention is the provision of a controlled feeding barrier for use at one or both ends of the uniform elongated silage bunk to cause feeding animals to consume the silage in a controlled and orderly feeding procedure at the ends only of the silage bunk and not randomly or along the sides of the bunk.

The controlled feeding barrier or apparatus consists essentially of a pair of side parallel skid mounted guide units which can straddle the opposite sides of the bunk and be advanced over the ground longitudinally of the elongated bunk as feeding progresses. A barrier gate extending transversely across the end face of the bunk is slidably mounted on the two guide units and is gradually advanced responsive to pressure exerted by feeding animals.

The invention, in essence, through the combination of the portable bunker and coacting controlled feeding barrier, provides a highly economical, efficient and convenient integrated system for building uniform silage bunks at any desired location and for enabling cattle to feed on the silage bunk with controlled restraint but without impeding the ability of the animals to nourish themselves fully. The wasting of feed is eliminated by the invention as well as the elimination of disorderly feeding at various points on the silage bunk or mass which can destroy the integrity of the bunk.

These and other advantages of the invention will become readily apparent to those skilled in the art.

BRIEF DESCRIPTION OF THE DRAWINGS

FIG. 1 is a partly schematic and partly exploded perspective view of the silage bunker according to the present invention and depicting the gradual formation therein of a silage bunk or feed mass.

FIG. 2 is a partly exploded perspective view of a single bunker wall section and bracing means.

FIG. 3 is a diagrammatic side elevation depicting the formation of an indefinite length silage bunk by means of the portable sectional bunker and cooperating loader apparatus.

FIG. 4 is an enlarged fragmentary plan view of adjacent bunker wall sections and bracing means taken on line 4—4 of FIG. 3.

FIG. 5 is a transverse vertical section through the bunker taken on line 5—5 of FIG. 3.

DETAILED DESCRIPTION

Figure 6:
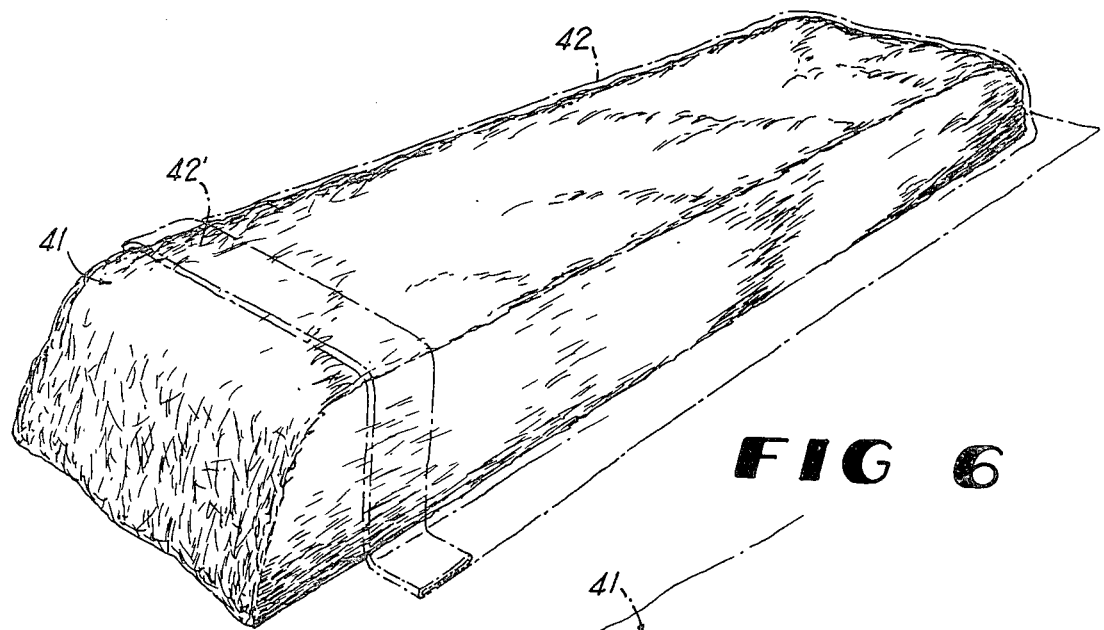
FIG. 6 is a perspective view of a completed silage bunk and flexible covering film therefor.
Figure 7:
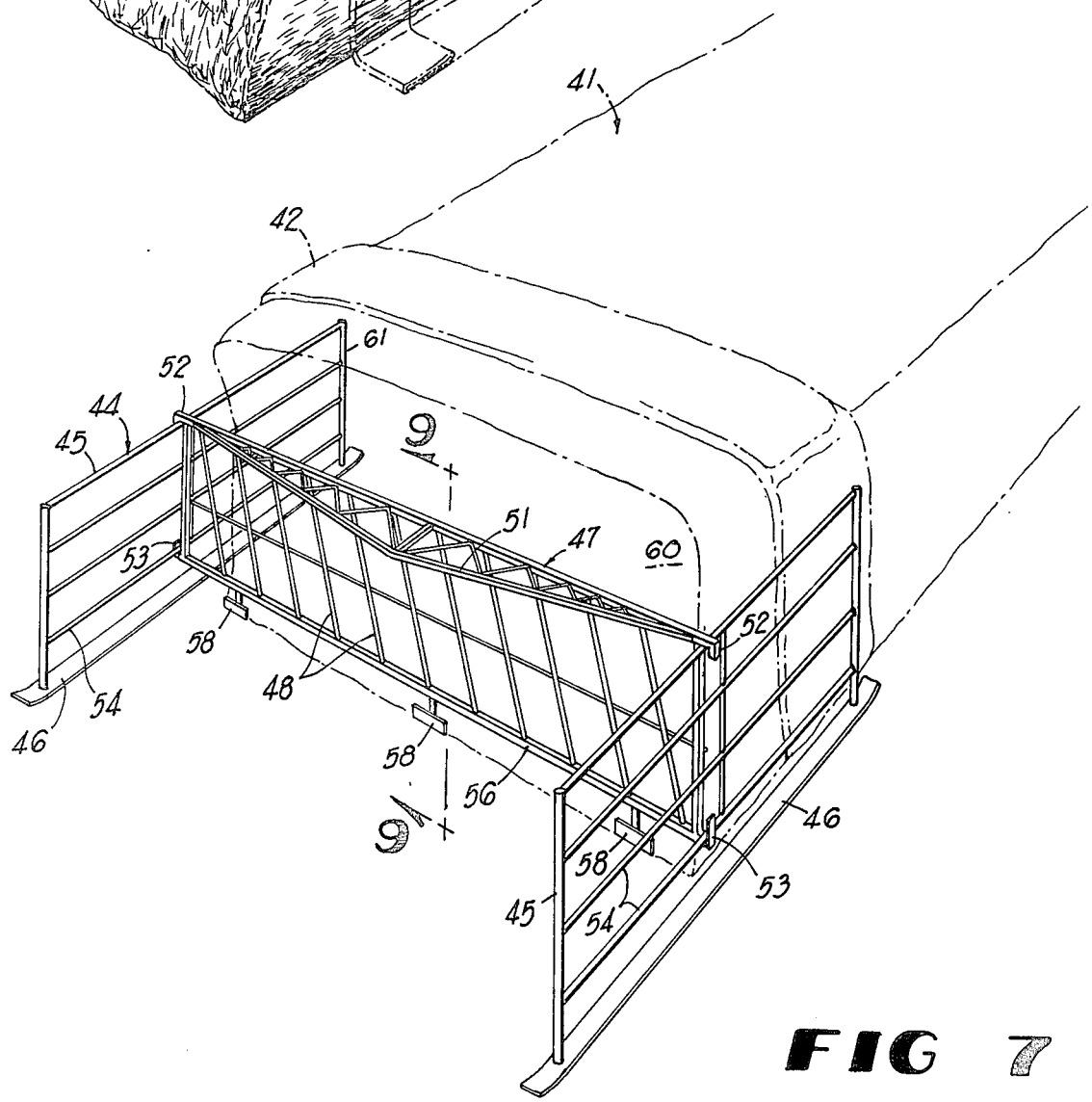
FIG. 7 is a perspective view of a controlled feeding apparatus or barrier used in conjunction with the silage bunk formed by the portable bunker.

Referring to the drawings in detail, and initially to FIGS. 1 through 5, wherein like numerals designate like parts, an expandable and readily portable silage bunker 20 or silo is constructed on substantially level ground from plural juxtaposed pairs of upright parallel wall sections 21, 22 and 23 assembled in end-to-end relationship to produce an elongated open-ended and open top bunker. While three pairs of wall sections have been shown, it should be understood that a greater or smaller number of pairs of wall sections may be employed in particular instances.

When the portable bunker is being set up, each upright wall section is temporarily braced and supported near opposite ends by a pair of struts 24 as shown in FIG. 2 where a single bunker wall section is shown in detail. The tops of the inclined struts 24 are releasably coupled to apertured lugs 25 secured to vertical channel braces 26 on the exterior side of the wall section 21. The bottoms of the struts 24 have ground-engaging feet 27 which are apertured to receive ground penetrating anchor stakes 28.

Following initial bracing in this manner, more secure support and bracing of the bunker side walls is obtained by the placement of a number of identical bracing assemblies 29 along each side wall, as indicated in FIGS. 1 and 5. Preferably three assemblies 29 are placed adjacent to each portable wall section 21, 22 and 23.

Each brace assembly 29 comprises a horizontal base channel member 30 which is received through a notch 31 in the lower edge of each bunker wall section, allowing the base member 30 to extend inwardly and outwardly of the adjacent upright wall section, as best shown in FIG. 5. Rising from each base member 30 and pivotally coupled thereto at 32 is an upright channel 33 whose top terminates near and below the upper edge of the adjacent bunker wall section. Each channel member 33 is located between the ends of base member 30, and in use abuts the outer surface of the adjacent bunker side wall section 21, 22 or 23. Each upright and base member 33 and 30 are adjustably interconnected by a diagonal brace 34 equipped with a turnbuckle 35, as illustrated. The assemblies 29 are not only portable but readily collapsible for storage purposes.

Each opposing pair of brace assemblies 29 at the opposite sides of the bunker 20 are adjustably tied together very securely by a chain 36 whose lower stretch passes through the base channels 30, FIG. 5, so as to form with these channels a partial floor for the bunker. Each chain then passes upwardly through the rising channels 33 and one end of each chain is attached to an anchor 37 fixed to the top of each bunker wall section wherever the assemblies 29 are located and directly above the notches 31.

Similarly, each chain 36 passes upwardly through the channel 33 at the opposite side of the bunker and is connected to a conventional chain tightener 38 and finally has its other end attached to an anchor 37 on the adjacent side of the bunker. The base channels 30 have suitable apertures 39 in their top webs to allow upward passage of the chain end portions through the channels 33. When chains 36 are securely tensioned, each opposing pair of brace assemblies 29 very securely brace the bunker side wall sections and resist lateral displacement thereof under the pressure of the silage bunk which the wall sections must retain and support.

When the portable bunker 20 is fully erected, a front end loader vehicle 40 may be efficiently and conveniently used to build up a solid and continuous well defined bunk 41. As shown in FIG. 3, the front end loader 40 can travel freely between the bunker side walls and will first build up the bunk 41 to the prescribed depth or level L at the forward end of the bunker between the wall sections 21. Gradually, the bunk will be built up to the same level L rearwardly from the wall sections 21 and between the wall sections 22 and 23 until the bunker is full. If an even longer bunk 41 is desired, the forward juxtaposed pair of wall sections 21 are moved to a new position 21', FIG. 3, immediately behind the rear wall sections 23 as indicated by directional arrow (1). Similarly, wall sections 22 can be relocated at 22' and the wall sections 23 can be relocated as at 23'. In this manner, the portable sectional bunker 20 can be utilized with a front end loader to create a silage bunk 41 of any length.

The bunk 41 thus formed in the process is of uniform height and uniform cross section, very well defined and solid. As successive wall sections 21, 22, 23, etc. are separated from the bunk 41, the latter is covered or draped with a preferably black plastic film 42 which can be gradually unfolded at its leading end indicated at 42' in FIG. 6 until the entire bunk of silage is enclosed.

A further constructional feature of the portable bunker shown in FIG. 4 is the provision on the vertical end edges of each wall section of the bunker of interfitting angle members 43 which render the bunker side walls continuous and free of gaps.

Figure 9:
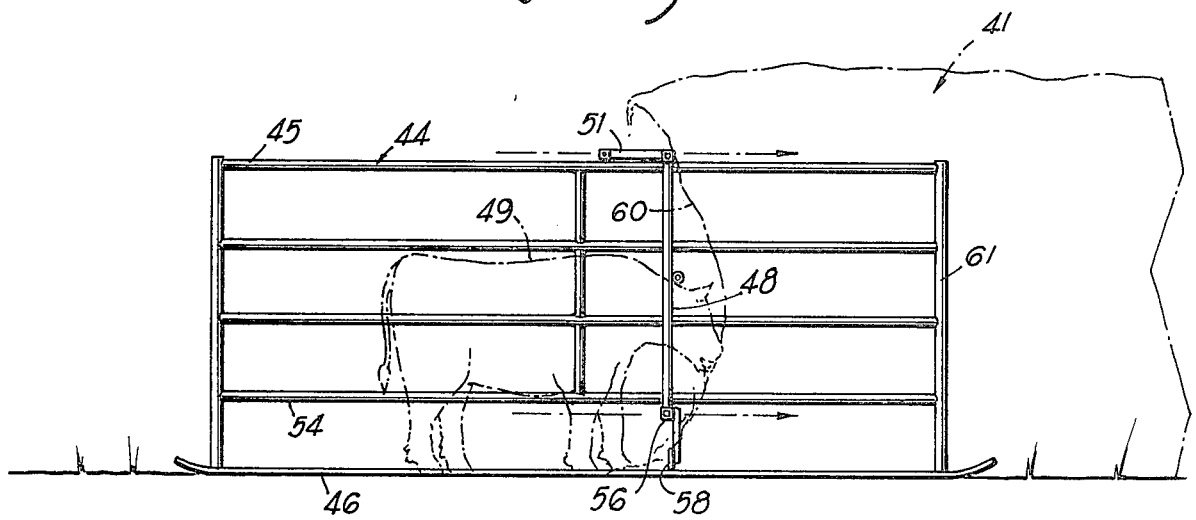
FIG. 9 is a vertical section taken on line 9—9 of FIG. 7.

Another major aspect of the invention is the provision of a controlled feeding assembly 44 or barrier used at one or both ends of the silage bunk 41 to insure consumption of the bunk without waste and with efficiency. The controlled feeding assembly comprises a pair of opposite side parallel upright guide rail units 45 mounted on skids 46 and adapted to be placed slightly outwardly of the opposite sides of the bunk 41 in straddling relation thereto, as shown in FIGS. 7 and 9-11. A transverse vertical controlled restraint gate or barrier 47 is slidably supported on the two guide rail units 45 and includes a plurality of equidistantly spaced vertical bars 48 between which the heads of feeding animals 49, FIG. 9, are inserted. A single transverse horizontal bar 50 fixed across the bars 48 near the center of height of the sliding gate 47 engages the necks of the feeding animals and serves as a propulsion member with the bars 48 for the sliding gate 47 which is continually advanced by the feeding animals as the bunk of silage is gradually consumed. This is best shown in FIG. 9.

The top of the sliding gate 47 preferably carries a stiffening truss 51 lying in a horizontal plane. At its top and opposite ends, the gate 47 has sliding support hooks 52 resting on the topmost bars of the two guide units 45. At its bottom, the gate 47 has upwardly directed guide elements 53 which embrace the lower bars 54 of guide units 45.

Figure 8:
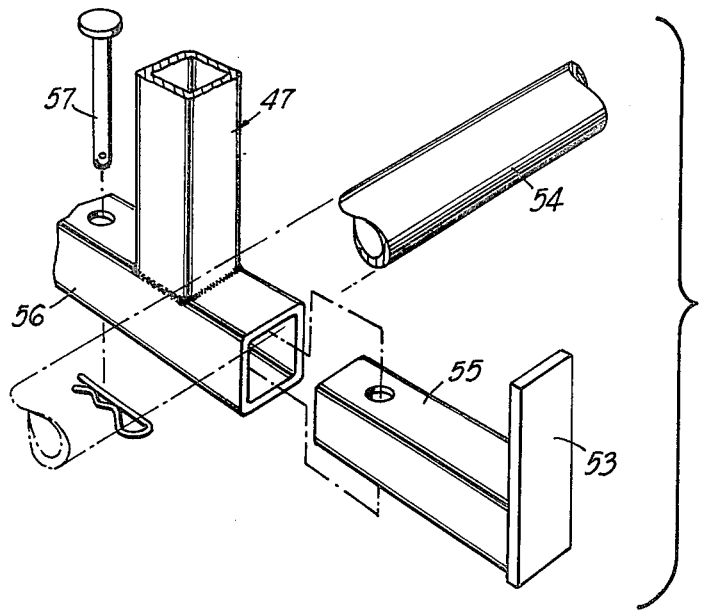
FIG. 8 is a fragmentary exploded perspective view of elements in the apparatus of FIG. 7.

As shown in FIG. 8, lower guide elements 53 of sliding gate 47 are carried by stub arms 55 which telescope into the lower transverse tube bar 56 of gate 47 and are locked therein by pin means 57. The bottom of the sliding gate 47 is equipped close to the ground with a number of scrapers or sweeps 58 which carry along any loose silage at the bottom of the bunk 41 to prevent wastage by encouraging the animals to feed at the bottom of the bunk as well as its top and intermediate portions. The arrangement contributes to maintaining a relatively even top-to-bottom profile 60 or end face on the bunk as it is gradually consumed at one end or at both ends, FIGS. 10 and 11.

Figure 10:
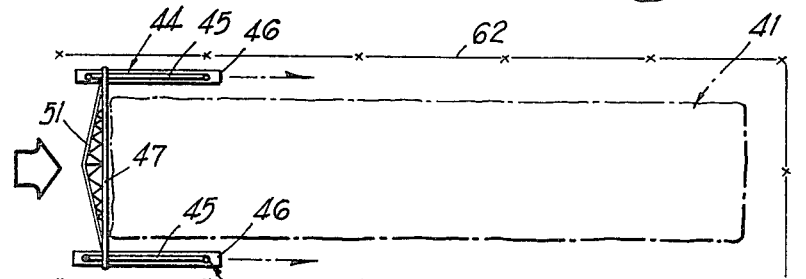
FIG. 10 is a plan view showing one unit of the controlled feeding apparatus in relation to one end of a silage bunk and a surrounding electrified barrier.
Figure 11:
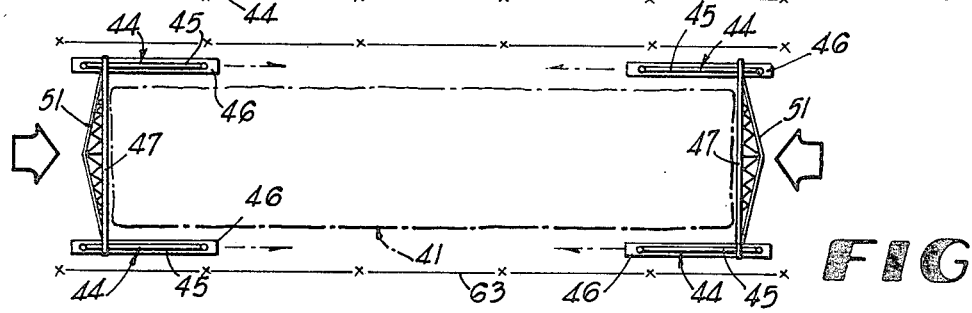
FIG. 11 is a similar view of two units of the controlled feeding apparatus at opposite ends of the silage bunk.

In the controlled feeding process, the assembly 44 is placed at one end, FIG. 10, or at both ends, FIG. 11, of the silage bunk 41 with the guide units 45 straddling the bunk and the gate 47 retracted to the outward ends of the units 45. The feeding animals 49, as they consume silage from the bunk end face 60, gradually push the gate 47 forwardly as indicated by the arrows in FIGS. 9, 10 and 11, until the gate contacts the vertical posts 61 at the far ends of guide units 45. At this time, the units 45 are slid forwardly on their skids 46 to a new straddling position with the bunk 41 and with the gate 47 again retracted to the rearward ends of guide units 45. In this way, the feeding process can continue from one or both ends of the bunk until the latter is entirely consumed. At that time, the controlled feeding apparatus 44 can be moved into engagement with another silage bunk or stored compactly at any convenient location. In this connection, the entire apparatus including feeding assembly 44, bunker 20 and its brace assemblies 29 is of a knockdown nature for compact storage and transport.

To prevent animals from attempting to nibble at the sides of the bunk 41, FIGS. 10 and 11, electrified fencing 62 or 63 may be placed close to the sides of the bunk, as illustrated in the drawings.

It is thought that the many advantages of the invention have now been made apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A portable silage bunker and controlled feeding apparatus comprising sectional parallel bunker side walls forming an elongated open top and open ended bunker adapted to be filled with silage by a mobile silage loading machine which can enter the bunker, bracing means along the bunker side walls also serving to tie the side walls together so that they can resist outward displacement under the pressure of silage loaded into the bunker, said sectional side walls and bracing means being readily separable from a silage bunk after the latter is formed in the bunker to a uniform height and uniform cross section, and a controlled feeding assembly for use at one or both ends of the silage bunk formed in the bunker including spaced parallel guide units adapted to straddle an end portion of the bunk and an animal restraint barrier slidably mounted on said guide units and extending therebetween and across one end face of the bunk and having opening means for the heads of feeding animals and adapted to be slidably advanced by feeding animals along said guide units as the silage bunk is consumed gradually from one or both of its ends, said bracing means comprising plural independent bracing assemblies in spaced relationship along said side walls and adjustable flexible ties interconnecting opposing pairs of the bracing assemblies along the bunker side walls, each bracing assembly comprising a base member and a member rising above the base member and connected therewith and adapted to bear on the outer face of one bunker side wall, the bunker side walls having notches in their lower edges adjacent to each bracing assembly and receiving said base members so that the latter can extend inwardly and outwardly of said bunker side walls, and said flexible ties comprising chains extending beneath the bunker side walls and transversely between them and upwardly from the base members along said rising members, and anchor elements on the tops of the bunker side walls to which opposite ends of each chain are releasably attached.

2. Apparatus as defined in claim 1, and the rising members of the bracing assemblies being hinged at their bottoms to the base members between the ends of the base members, and adjustable length braces interconnecting said rising and base members of the bracing assemblies.

3. A portable silage bunker and controlled feeding apparatus comprising sectional parallel bunker side walls forming an elongated open top and open ended bunker adapted to be filled with silage by a mobile silage loading machine which can enter the bunker, bracing means along the bunker side walls also serving to tie the side walls together so that they can resist outward displacement under the pressure of silage loaded into the bunker, said sectional side walls and bracing means being readily separable from a silage bunk after the latter is formed in the bunker to a uniform height and uniform cross section, and a controlled feeding assembly for use at one or both ends of the silage bunk formed in the bunker including spaced parallel guide units adapted to straddle an end portion of the bunk and an animal restraint barrier slidably mounted on said guide units and extending therebetween and across one end face of the bunk and having opening means for the heads of feeding animals and adapted to be slidably advanced by feeding animals along said guide units as the silage bunk is consumed gradually from one or both of its ends, said bracing means comprising plural independent bracing assemblies in spaced relationship along said side walls and adjustable flexible ties interconnecting opposing pairs of the bracing assemblies along the bunker side walls, and bracing struts adapted for connection with the bunker side walls and adapted for anchoring to the ground to initially support said side walls prior to the placement of said bracing assemblies in engagement with the side walls.

4. In a portable silage bunker, at least a pair of bunker side wall sections adapted to contain silage between them when they are held in upright opposing relationship, and at least one pair of bracing assemblies for said side wall sections comprising a pair of base members in spaced end-to-end relationship with one base member engaging beneath one bunker side wall section transversely thereof, upright members rising from said base members between the ends thereof and engaging the outer faces of the bunker side wall sections to stabilize them, and a flexible tie interconnecting the bracing assemblies and having an adjustable connection with the top of each bunker side wall section, said tie extending transversely between said side wall sections at their bottoms, and the bracing assemblies having guide passage means for said tie.

5. In a portable silage bunker as defined in claim 4, and said base and said upright members comprising channel bars and the channel passages of said bars forming said guide passage means for said flexible tie, each base member having an opening formed therein between its ends for the upward passage of said tie along the adjacent upright member.

6. In a portable silage bunker as defined in claim 5, and said flexible tie comprising a chain.

7. In a portable silage bunker as defined in claim 4, and each upright member having its lower end hingedly attached to the underlying base member, and an adjustable rigid diagonal brace extending between the outer end of each base member and a median point on the adjacent upright member.

8. In a portable silage bunker as defined in claim 7, and each diagonal brace including a turnbuckle.

* * * * *